(12) United States Patent
Sakai et al.

(10) Patent No.: US 12,431,781 B2
(45) Date of Patent: Sep. 30, 2025

(54) MAGNETIC GEARED ELECTRICAL MACHINE AND POWER GENERATION SYSTEM

(71) Applicant: MITSUBISHI HEAVY INDUSTRIES, LTD., Tokyo (JP)

(72) Inventors: Masayuki Sakai, Tokyo (JP); Yasutaka Aoki, Tokyo (JP); Takatoshi Matsushita, Tokyo (JP); Mikito Sasaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 75 days.

(21) Appl. No.: 18/274,094

(22) PCT Filed: Jan. 25, 2022

(86) PCT No.: PCT/JP2022/002500
§ 371 (c)(1),
(2) Date: Jul. 25, 2023

(87) PCT Pub. No.: WO2022/163601
PCT Pub. Date: Aug. 4, 2022

(65) Prior Publication Data
US 2024/0413731 A1    Dec. 12, 2024

(30) Foreign Application Priority Data

Jan. 29, 2021  (JP) ................................ 2021-012748

(51) Int. Cl.
*H02K 49/10*    (2006.01)
(52) U.S. Cl.
CPC .................................. *H02K 49/102* (2013.01)
(58) Field of Classification Search
CPC ...... H02K 49/102; H02K 7/1838; H02K 9/02; H02K 2201/03; H02K 16/02
See application file for complete search history.

(56) References Cited

U.S. PATENT DOCUMENTS 9,219,395 B2    12/2015   Powell et al.
2005/0189830 A1   9/2005   Corbin et al.
(Continued)

FOREIGN PATENT DOCUMENTS

CA    2046494 A1 *   1/1993   ............. H02K 16/02
EP    2169815 A2     3/2010
(Continued)

OTHER PUBLICATIONS

JP-6804700-B1_translate (Year: 2020).*
(Continued)

*Primary Examiner* — Tulsidas C Patel
*Assistant Examiner* — Mohammed Ahmed Qureshi
(74) *Attorney, Agent, or Firm* — Osha Bergman Watanabe & Burton LLP (57) ABSTRACT

A magnetic geared electrical machine includes: a stator including a stator coil; a first rotor which includes a plurality of pole pieces arranged with a first radial gap between the stator and the plurality of pole pieces, a first cooling passage including the first radial gap being formed between the first rotor and the stator; a second rotor which includes a plurality of rotor magnets, is arranged opposite to the stator across the first rotor in a radial direction with a second radial gap between the pole pieces and the plurality of rotor magnets, a second cooling passage including the second radial gap being formed between the first rotor and the second rotor; an inlet cavity for cooling gas formed on one end side in an axial direction with respect to the stator, the first rotor and the second rotor; and an outlet cavity formed on another end side in the axial direction with respect to the stator, the first rotor and the second rotor, the outlet cavity being configured to receive the cooling gas that has passed through each of the first cooling passage and the second cooling passage. A (Continued)

dimension of the first radial gap is greater than a dimension of the second radial gap.

8 Claims, 6 Drawing Sheets

(56) References Cited

U.S. PATENT DOCUMENTS

| | | | |
|---|---|---|---|
| 2010/0079016 A1* | 4/2010 | Hemmelmann | H02K 9/227 |
| | | | 310/54 |
| 2022/0416639 A1 | 12/2022 | Kometani et al. | |
| 2023/0045743 A1 | 2/2023 | Sakai et al. | |
| 2023/0049224 A1 | 2/2023 | Sakai et al. | |

FOREIGN PATENT DOCUMENTS

| | | | | |
|---|---|---|---|---|
| JP | 2011092000 | A | 5/2011 | |
| JP | 2012246982 | A | 12/2012 | |
| JP | 2013059177 | A | 3/2013 | |
| JP | 6804700 | B1 * | 12/2020 | ............... H02K 1/17 |
| JP | 2021116843 | A | 8/2021 | |
| JP | 2021118591 | A | 8/2021 | |

OTHER PUBLICATIONS

International Search Report and Written Opinion issued in corresponding International Application No. PCT/JP2022/002500, mailed Mar. 8, 2022 (9 pages).
International Preliminary Report on Patentability issued in corresponding International Application No. PCT/JP2022/002500, mailed on Aug. 10, 2023, with English translation (12 pages).
Extended European Search Report issued in counterpart European application No. 22745822.1, dated Jun. 4, 2024 (14 pages).

* cited by examiner

MAGNETIC GEARED ELECTRICAL MACHINE AND POWER GENERATION SYSTEM

TECHNICAL FIELD

The present disclosure relates to a magnetic geared electrical machine and a power generation system using the same.

This application claims the priority of Japanese Patent Application No. 2021-012748 filed on Jan. 29, 2021, the content of which is incorporated herein by reference.

BACKGROUND

Conventionally, a magnetic geared electrical machine is known that combines a magnetic gear device for converting a rotation speed between a high-speed rotor and a low-speed rotor with a generator or an electric motor.

For example, Patent Document 1 describes a magnetic geared electrical machine that comprises a first rotor including a support structure, a second rotor, and a stator, and is configured such that at least one of the second rotor and stator accommodates the support structure.

Further, although not related to the magnetic geared electrical machine, Patent Document 2 describes a magnetic gear device in which a cooling medium flow path is disposed between electromagnetic steel magnetic path members (pole pieces) arranged in the circumferential direction.

CITATION LIST

Patent Literature

Patent Document 1: U.S. Pat. No. 9,219,395B
Patent Document 2: JP2012-246982A

SUMMARY

Technical Problem

For example, in the magnetic geared electrical machine described in Patent Document 1, heat generation due to copper loss in a stator coil or iron loss in a pole piece can be a problem.

A peripheral section of the stator coil as a heat generating part can be cooled by a cooling jacket provided in the stator. On the other hand, as for the pole piece which is an example of another heat generating part, it is difficult to install the cooling jacket since the pole piece is a rotating member. In particular, a portion of the stator closer to the pole piece than the stator coil cannot expect a high cooling effect by the cooling jacket due to a distance from the cooling jacket, although said portion of the stator has a higher risk of temperature rise than another portion due to heat input from two heat generating sources which are the stator coil and the pole piece.

In the magnetic gear device described in Patent Document 2, it is configured such that the cooling medium flow path is formed between pole pieces in a magnetic path member holder fixed to a base portion of the magnetic gear device and bleed air from a compressor is introduced into the cooling medium flow path from the outside.

However, in the case of a magnetic geared electrical machine in which the magnetic path member holder including the pole pieces is a rotating member, forming the cooling medium flow path between the pole pieces which are rotating parts complicates a structure.

In view of the above, an object of some embodiments of the present invention is to provide a magnetic geared electrical machine capable of promoting, with a simple structure, heat dissipation from the heat generating part of the magnetic geared electrical machine which is difficult to cool with the cooling jacket.

Solution to Problem (1) A magnetic geared electrical machine according to at least one embodiment of the present invention, includes: a stator including a stator coil; a first rotor which includes a plurality of pole pieces arranged with a first radial gap between the stator and the plurality of pole pieces, a first cooling passage including the first radial gap being formed between the first rotor and the stator; a second rotor which includes a plurality of rotor magnets, is arranged opposite to the stator across the first rotor in a radial direction with a second radial gap between the pole pieces and the plurality of rotor magnets, a second cooling passage including the second radial gap being formed between the first rotor and the second rotor; an inlet cavity for cooling gas formed on one end side in an axial direction with respect to the stator, the first rotor and the second rotor; and an outlet cavity formed on another end side in the axial direction with respect to the stator, the first rotor and the second rotor, the outlet cavity being configured to receive the cooling gas that has passed through each of the first cooling passage and the second cooling passage. A dimension of the first radial gap is greater than a dimension of the second radial gap.

Advantageous Effects

According to at least one embodiment of the present invention, it is possible to promote, with a simple structure, heat dissipation from a heat generating part of a magnetic geared electrical machine which is difficult to cool with a cooling jacket.

DETAILED DESCRIPTION

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

(Overview of Magnetic Geared Electrical Machine)

Figure 1A:
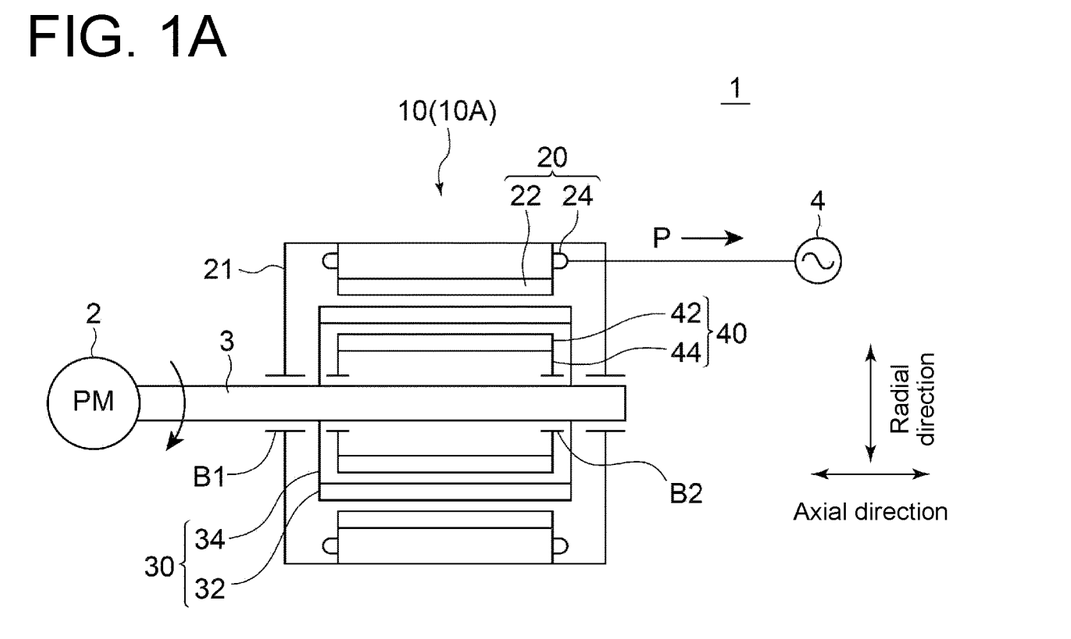
FIG. 1A is a schematic view showing an example of a magnetic geared electrical machine according to an embodiment.
Figure 1B:
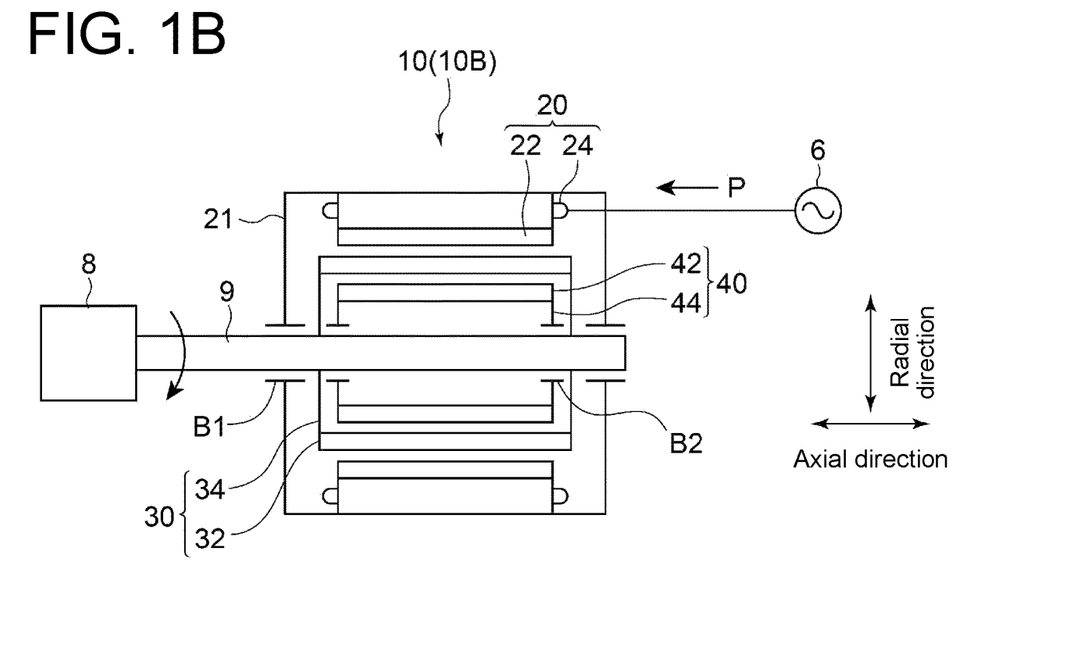
FIG. 1B is a schematic view showing an example of the magnetic geared electrical machine according to an embodiment.

FIGS. 1A and 1B are each a schematic view showing an example of a magnetic geared electrical machine. Herein, in FIGS. 1A and 1B, the "axial direction" is a direction parallel to a rotational axis of a rotor (30, 40) of a magnetic geared electrical machine 10, and the "radial direction" is a direction orthogonal to the rotational axis of the rotor (30, 40).

In an embodiment, as shown in FIG. 1A, the magnetic geared electrical machine 10 is a magnetic geared generator 10A configured to be driven by a prime mover 2 to generate power and supply electric power P generated by the power generation to a power supply destination 4 which may be, for example, a power grid.

In another embodiment, as shown in FIG. 1B, the magnetic geared electrical machine 10 is a magnetic geared motor 10B configured to drive a rotating machine 8 upon receiving the electric power P supplied from a power supply source 6 which may be, for example, a power grid.

In the embodiment shown in FIG. 1A, the magnetic geared generator 10A constitutes part of a power generation system 1. The power generation system 1 may be, for example, a renewable energy power generation system such as a wind power generation system or a tidal current power generation system. If the power generation system 1 is a wind power generation system, the prime mover 2 is a wind turbine rotor.

The magnetic geared generator 10A includes a stator 20 with a stator magnet 22 and a stator coil 24, a first rotor 30 with a pole piece 32, and a second rotor 40 with a rotor magnet 42. In the example shown in FIG. 1A, the stator 20 is arranged inside a housing 21 for supporting a rotational shaft 3 of the prime mover 2 via a bearing B1. The first rotor 30 is configured to rotate with the rotational shaft 3 of the prime mover 2. The first rotor 30 includes first end plates 34 respectively disposed at both axial ends of the pole piece 32, and each of the first end plates 34 is connected to the rotational shaft 3. The second rotor 40 includes second end plates 44 respectively disposed at both axial ends of the rotor magnet 42. Each of the second end plates 44 is mounted on the rotational shaft 3 (or the first rotor 30 rotating together with the rotational shaft 3) via a bearing B2 so as to allow the second rotor 40 to rotate faster than the rotational shaft 3 and the first rotor 30. The second rotor 40 is disposed within a region surrounded by the first rotor 30 including the pole piece 32 and the first end plates 34 and the rotational shaft 3.

In the embodiment shown in FIG. 1A, the magnetic geared generator 10A has a configuration in which the stator 20, the first rotor 30, and the second rotor 40 are arranged in order radially inward. In another embodiment, the magnetic geared generator 10A has a configuration in which the second rotor 40, the first rotor 30, and the stator 20 are arranged in order radially inward. In this case, the second rotor 40, the first rotor 30, and the stator 20 are arranged radially inward of the cylindrical rotational shaft 3.

The above-described magnetic geared generator 10A is an integrated combination of a magnetic gear and a generator, and is configured to convert a mechanical input from the prime mover 2 into power by utilizing a harmonic type magnetic gear principle and electromagnetic induction.

For example, power generation in the magnetic geared generator 10A may be performed according to the following principle. A magnetic flux of the stator magnet 22 is modulated by the pole piece 32 of the first rotor (low-speed rotor) 30 rotating together with the rotational shaft 3 of the prime mover 2, and the rotor magnet 42 receives a magnetic force from the modulated magnetic field, thereby rotating the second rotor (high-speed rotor) 40. At this time, the ratio (speed increasing ratio) of the rotation speed of the second rotor (high-speed rotor) 40 to the first rotor (low-speed rotor) 30 is expressed by a ratio of the number of poles NL of the pole piece 32 to the number of pole pairs NH of the rotor magnet 42 (=NL/NH). When the second rotor (high-speed rotor) 40 rotates, an electric current is generated in the stator coil 24 by electromagnetic induction.

In the embodiment shown in FIG. 1B, the basic configuration of the magnetic geared motor 10B is common to the magnetic geared generator 10A shown in FIG. 1A.

That is, the magnetic geared motor 10B includes the stator 20 with the stator magnet 22 and the stator coil 24, the first rotor 30 with the pole piece 32, and the second rotor 40 with the rotor magnet 42. In the example shown in FIG. 1B, the stator 20 is fixed to the inside of the housing 21 for supporting a rotational shaft 9 of the rotating machine 8 via the bearing B1. The first rotor 30 includes the first end plates 34 respectively disposed at the both axial ends of the pole piece 32, and each of the first end plates 34 is connected to the rotational shaft 9. The second rotor 40 includes second end plates 44 respectively disposed at the both axial ends of the rotor magnet 42. Each of the second end plates 44 is mounted on the rotational shaft 9 (or the first rotor 30 rotating together with the rotational shaft 9) via the bearing B2 so as to allow the second rotor 40 to rotate faster than the rotational shaft 9 and the first rotor 30. The second rotor 40 is disposed within the region surrounded by the first rotor 30 including the pole piece 32 and the first end plates 34 and the rotational shaft 9.

In the embodiment shown in FIG. 1B, the magnetic geared motor 10B has a configuration in which the stator 20, the first rotor 30, and the second rotor 40 are arranged in order radially inward. In another embodiment, the magnetic geared motor 10B has a configuration in which the second rotor 40, the first rotor 30, and the stator 20 are arranged in order radially inward. In this case, the second rotor 40, the first rotor 30, and the stator 20 are arranged radially inward of the cylindrical rotational shaft 9.

The magnetic geared motor 10B is an integrated combination of a magnetic gear and a motor, rotates the second rotor (high-speed rotor) 40 by a rotating magnetic field generated by energizing the stator coil 24, and utilizes the principle of a harmonic magnetic gear to transmit power from the second rotor (high-speed rotor) 40 to the first rotor (low-speed rotor) 30.

(Internal Structure of Magnetic Geared Electrical Machine)

Subsequently, an internal structure of the above-described magnetic geared electrical machine 10 (10A, 10B) will be described with reference to FIG. 2.

Figure 2:
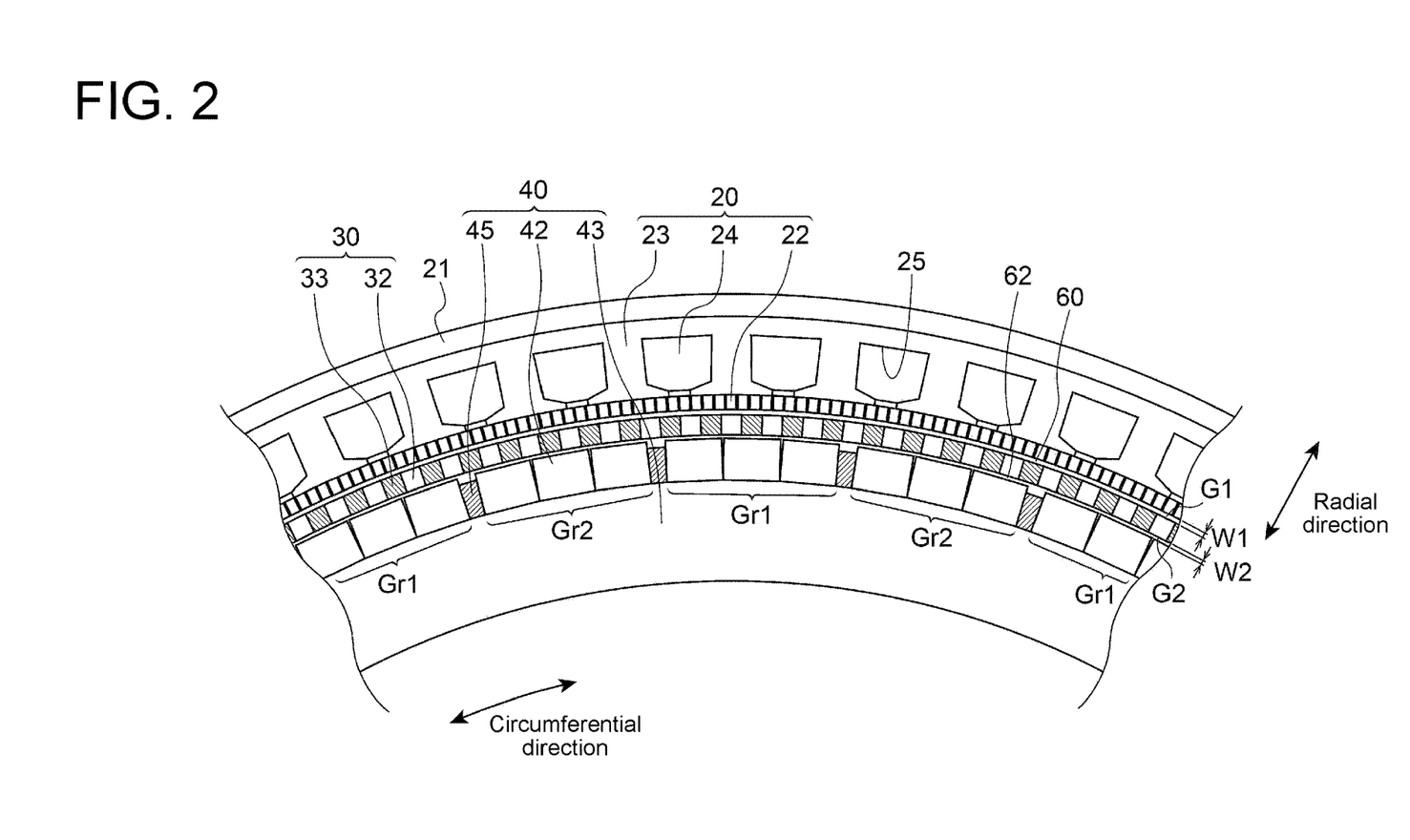
FIG. 2 is a radial cross-sectional view of the magnetic geared electrical machine according to an embodiment.

FIG. 2 is a radial cross-sectional view of the magnetic geared electrical machine 10 according to an embodiment.

As shown in FIG. 2, the stator 20 of the magnetic geared electrical machine 10 includes a plurality of stator magnets 22 and stator coils 24 arranged in the circumferential direction. The stator magnets 22 and the stator coils 24 are attached to a stator core 23.

The stator magnets 22 are composed of permanent magnets, and the plurality of stator magnets 22 are disposed in the circumferential direction so as to axially pass between the stator coils 24 and the first rotor 30 in the radial direction. In the example shown in FIG. 2, each of the stator magnets 22 is an axially elongated rod-shaped member having a rectangular cross section. That is, a dimension of each side of the rectangular cross section of the stator magnet 22 shown in FIG. 2 is sufficiently less than an axial dimension of the stator magnet 22 shown in FIGS. 1A and 1B.

FIG. 2 shows a structural example of a surface permanent magnet (SPM) in which the stator magnets 22 are attached to the surface of the stator core 23. In another embodiment, the stator 20 may have a structure of an interior permanent magnet (IPM) in which the stator magnets 22 are embedded in the stator core 23.

The stator coils 24 are disposed within a plurality of slots 25 disposed in the stator core 23. The plurality of slots 25 are disposed in the circumferential direction, and each of the slots 25 extends in the axial direction. Both axial ends of each of the slots 25 are open, and coil ends of the stator coil 24 that do not fit into the slot 25 may protrude from the stator core 23 at both axial ends of the stator core 23.

The first rotor 30 which is opposed to the stator 20 of the above-described configuration in the radial direction includes the plurality of pole pieces 32 arranged in the circumferential direction. Each of the pole pieces 32 is composed of a magnetic material such as an electromagnetic steel plate or a powder magnetic core, and is an axially elongated rod-shaped member having the rectangular cross section (see FIG. 2). That is, a dimension of each side of the rectangular cross section of the pole piece 32 shown in FIG. 2 is sufficiently less than an axial dimension of the pole piece 32 shown in FIGS. 1A and 1B.

The pole piece 32 is arranged with a first radial gap G1 between the stator 20 and the pole piece 32. The first radial gap G1 has a radial dimension W1 and is part of a first cooling passage 60 (described later) formed between the first rotor 30 and the stator 20.

Besides the pole pieces 32, the first rotor 30 may include other members such as a non-magnetic member 33 (see FIG. 2) which is composed of a non-magnetic material and connects the pole pieces 32 in the circumferential direction and the first end plates 34 described above with reference to FIGS. 1A and 1B.

The non-magnetic member 33 may be a fiber reinforced plastic (FRP) in which reinforcing fibers are combined with a matrix resin and may be, for example, CFRP using carbon fibers as reinforcing fibers or GFRP using glass fibers as reinforcing fibers. The first end plate 34 is an annular plate extending along the radial direction from a connection position with the rotational shaft 3, 9 toward the pole piece 32.

As shown in FIG. 2, the second rotor 40 is disposed opposite to the stator 20 across the first rotor 30 of the above-described configuration in the radial direction with a second radial gap G2 between the pole piece 32 of the first rotor 30 and the rotor magnet 42. The second radial gap G2 has a radial dimension W2 and is part of a second cooling passage 62 (described later) formed between the first rotor 30 and the stator 20. Comparing the dimension W2 of the second radial gap G2 with the dimension W1 of the first radial gap G1, the relation of W1>W2 is established.

The second rotor 40 may be arranged to be surrounded by the first rotor 30 including the pole piece 32, the non-magnetic member 33, and the first end plate 34 as described above with reference to FIGS. 1A and 1B.

The second rotor 40 includes a plurality of rotor magnets 42 each of which is composed of a permanent magnet, and the plurality of rotor magnets 42 are arranged in the circumferential direction. Each of the rotor magnets 42 may be an axially elongated rod-shaped member having the rectangular cross section (see FIG. 2). Herein, the rotor magnet 42 is "axially elongated" means that a dimension of each side of the rectangular cross section of the rotor magnet 42 shown in FIG. 2 is sufficiently less than an axial dimension of the rotor magnet 42 shown in FIGS. 1A and 1B.

FIG. 2 shows a structural example of a surface permanent magnet (SPM) in which the rotor magnet 42 is attached to the surface of the rotor core 43. In another embodiment, the second rotor 40 may have a structure of an interior permanent magnet (IPM) in which the rotor magnet 42 is embedded in the rotor core 43.

Further, in the exemplary embodiment shown in FIG. 2, the plurality of rotor magnets 42 form at least two magnet groups (Gr1, Gr2) arranged with gaps in the circumferential direction on the surface of the rotor core 43. For example, each of the magnet groups (Gr1, Gr2) is composed of the plurality of rotor magnets 42 having the same magnetization direction.

Besides the rotor magnet 42 and the rotor core 43, the second rotor 40 may include other members such as the second end plate 44 described above with reference to FIGS. 1A and 1B and a closure member 45 for filling the circumferential gap between the rotor magnets 42.

The second end plate 44 is an annular plate extending along the radial direction from a mounting position of the bearing B2 toward the rotor core 43.

Further, the closure member 45 may be a fiber reinforced plastic (FRP) in which reinforcing fibers are combined with a matrix resin and may be, for example, CFRP using carbon fibers as reinforcing fibers or GFRP using glass fibers as reinforcing fibers. As shown in FIG. 2, the closure member 45 may close at least part of the circumferential gap between the magnet groups (Gr1, Gr2) alternately arranged in the circumferential direction. In this case, a height from the rotor core 43 to a surface of the closure member 45 may be less than a protrusion height of each rotor magnet 42 from the rotor core 43.

In the exemplary embodiment shown in FIG. 2, the number of stator coils 24, rotor magnets 42, pole pieces 32, and stator magnets 22 are in ascending order.

(Cooling Structure of Magnetic Geared Electrical Machine)

In the magnetic geared electrical machine 10 (10A, 10B) configured as described above, as a countermeasure against heat generation due to copper loss in the stator coil 24 or iron loss in the pole piece 32, the magnetic geared electrical machine 10 is internally provided with a cooling gas flow path.

Figure 3:
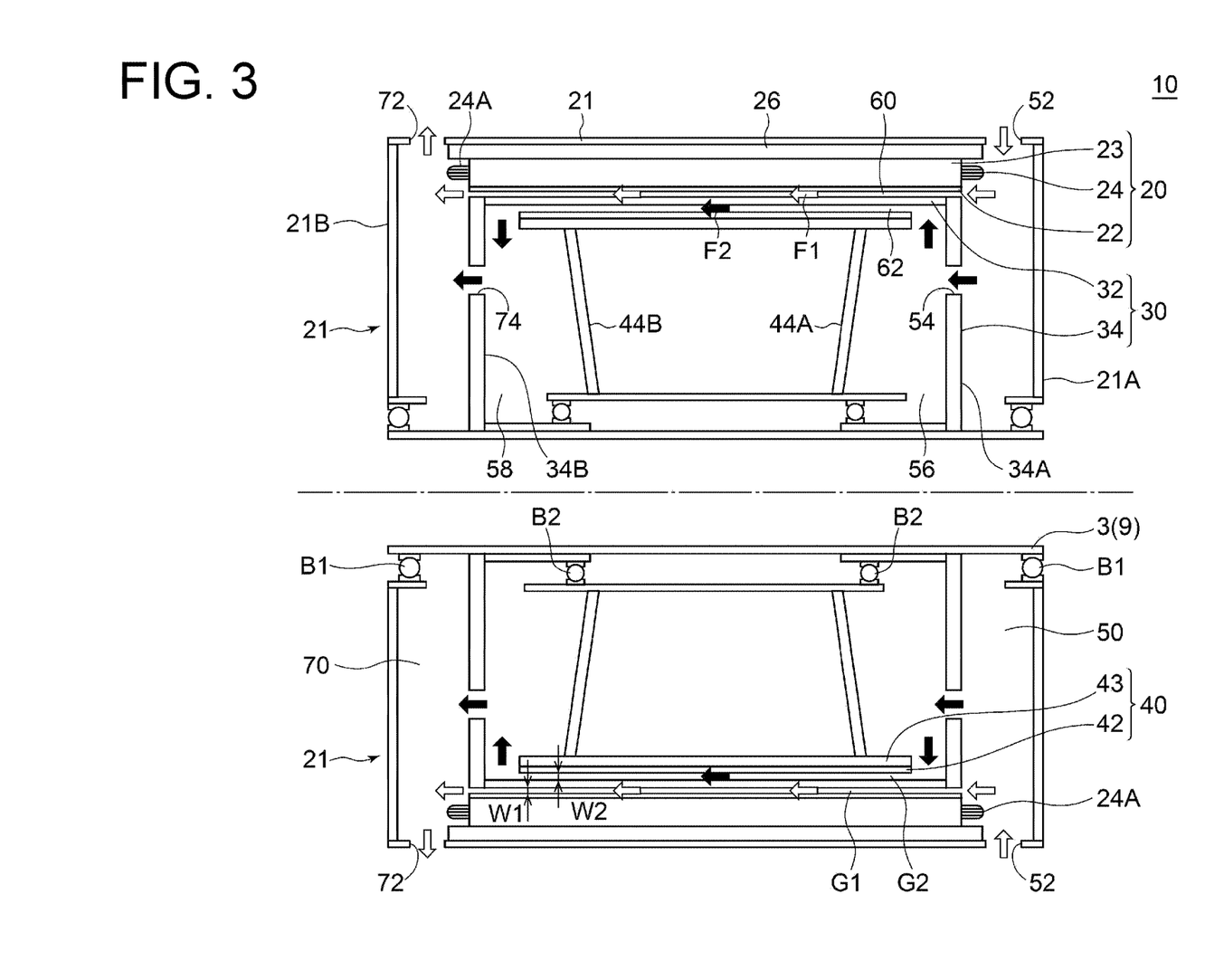
FIG. 3 is an axial cross-sectional view of the magnetic geared electrical machine according to an embodiment.

FIG. 3 is an axial cross-sectional view showing the magnetic geared electrical machine 10 according to an embodiment.

As shown in the drawing, in some embodiments, the magnetic geared electrical machine 10 includes an inlet cavity 50 into which cooling gas is introduced, and an outlet cavity 70 for receiving cooling gas having passed through each of the first cooling passage 60 between the stator 20 and the first rotor 30 and the second cooling passage 62 between the first rotor 30 and the second rotor 40.

The inlet cavity 50 is formed on one end side in the axial direction with respect to the stator 20, the first rotor 30 and the second rotor 40. On the other hand, the outlet cavity 70 is formed on another end side in the axial direction with respect to the stator 20, the first rotor 30 and the second rotor 40. In other words, the outlet cavity 70 is located opposite to the inlet cavity 50 across the stator 20, the first rotor 30, and the second rotor 40 in the axial direction.

In the exemplary embodiment shown in FIG. 3, the inlet cavity 50 is defined by one radial wall 21A of the housing 21 mounted on the rotational shaft (3, 9) via the bearing B1, and an axial end face of the stator 20 and a first end plate 34A of the first rotor 30 which are opposed to the one radial wall 21A of the housing 21. That is, the inlet cavity 50 is an annular space which is formed between: the one radial wall 21A of the housing 21; and the axial end face of the stator 20 and the one first end plate 34A of the first rotor 30, and surrounds the rotational shaft (3, 9) in the axial direction. The inlet cavity 50 communicates with an inlet duct (not shown) via a cooling gas inlet 52 disposed on one end side of the housing 21 in the axial direction, and the cooling gas is introduced from the inlet duct via the cooling gas inlet 52. The cooling gas inlet 52 may be disposed at a plurality of locations in the circumferential direction on the one end side of the housing 21 in the axial direction.

A coil end 24A which is formed by protruding a part of the stator coil 24 from the stator core 23 in the axial direction is exposed in the inlet cavity 50.

The inlet cavity 50 communicates with the first cooling passage 60 including the first radial gap G1. The first cooling passage 60 is an annular flow path formed between the stator 20 and the first rotor 30 in the radial direction so as to extend in the axial direction. An upstream end of the first cooling passage 60 is fluidly connected to the inlet cavity 50, and the cooling gas in the inlet cavity 50 is introduced into the first cooling passage 60.

Further, the inlet cavity 50 communicates with the second cooling passage 62 including the second radial gap G2, via an inlet opening 54 disposed in the first end plate 34A of the first rotor 30 facing the inlet cavity 50. The second cooling passage 62 is an annular flow path formed between the first rotor 30 and the second rotor 40 in the radial direction so as to extend in the axial direction.

In the exemplary embodiment shown in FIG. 3, the inlet cavity 50 communicates with an upstream intermediate cavity 56 formed inside the first rotor 30, via the inlet opening 54 in the one first end plate 34A. The upstream intermediate cavity 56 is an annular space formed between the one first end plate 34A of the first rotor 30 and one second end plate 44A of the second rotor 40 opposed to the one first end plate 34A of the first rotor 30. An upstream end of the second cooling passage 62 is fluidly connected to the upstream intermediate cavity 56, and the cooling gas in the inlet cavity 50 is introduced into the second cooling passage 62 through the upstream intermediate cavity 56.

Further, the cooling gas having passed through the first cooling passage 60 and the second cooling passage 62 is introduced to the outlet cavity 70 located on another end side in the axial direction across the stator 20, the first rotor 30, and the second rotor 40.

In the exemplary embodiment shown in FIG. 3, the outlet cavity 70 is defined by another radial wall 21B of the housing 21 mounted on the rotational shaft (3, 9) via the bearing B1, and an axial end face of the stator 20 and a first end plate 34B of the first rotor 30 which are opposed to the another radial wall 21B of the housing 21. That is, the outlet cavity 70 is an annular space which is formed between: the another radial wall 21B of the housing 21; and the stator 20 and the other first end plate 34B of the first rotor 30, and surrounds the rotational shaft (3, 9) in the axial direction. The outlet cavity 70 communicates with an outlet duct (not shown) via a cooling gas outlet 72 disposed on another end side of the housing 21 in the axial direction, and the cooling gas is discharged from the outlet cavity 70 to the outlet duct via the cooling gas outlet 72. The cooling gas outlet 72 may be disposed at a plurality of locations in the circumferential direction on the another end side of the housing 21 in the axial direction. The coil end 24A which is formed by protruding a part of the stator coil 24 from the stator core 23 in the axial direction is exposed in the outlet cavity 70.

The outlet cavity 70 communicates with the first cooling passage 60 including the first radial gap G1. A downstream end of the first cooling passage 60 is fluidly connected to the outlet cavity 70, and the cooling gas heated through the first cooling passage 60 flows out to the outlet cavity 70.

Further, the outlet cavity 70 communicates with the second cooling passage 62 including the second radial gap G2, via an outlet opening 74 disposed in the other first end plate 34B facing the outlet cavity 70.

In the exemplary embodiment shown in FIG. 3, the outlet cavity 70 communicates with a downstream intermediate cavity 58 formed inside the first rotor 30, via the outlet opening 74 in the other first end plate 34B. The downstream intermediate cavity 58 is an annular space formed between the other first end plate 34B of the first rotor 30 and the other second end plate 44B of the second rotor 40 opposed to the other first end plate 34B of the first rotor 30. A downstream end of the second cooling passage 62 is fluidly connected to the downstream intermediate cavity 58, and the cooling gas heated through the second cooling passage 62 is introduced to the outlet cavity 70 through the downstream intermediate cavity 58.

In the embodiment shown in FIG. 3, the magnetic geared electrical machine 10 includes a cooling jacket 26 for cooling the stator 20. The cooling jacket 26 may be disposed between the stator core 23 and the housing 21 in the radial direction, or may be disposed inside the stator core 23.

The cooling jacket 26 is supplied with a cooling medium (for example, cooling water or cooling air) via a cooling medium supply pipe (not shown) connected to the cooling jacket 26. The cooling medium increased in temperature by taking heat from the stator 20 is discharged from a cooling medium discharge pipe (not shown) connected to the cooling jacket 26.

In the above-described magnetic geared electrical machine 10, a first flow F1 from the inlet cavity 50 to the outlet cavity 70 through the first cooling passage 60 and a second flow F2 from the inlet cavity 50 to the outlet cavity 70 through the second cooling passage 62 are formed. That is, the cooling gas in the inlet cavity 50 is divided into the first flow F1 toward the first cooling passage 60 and the second flow F2 toward the second cooling passage 62, and the first flow F1 having passed through the first cooling passage 60 and the second flow F2 having passed through the second cooling passage 62 rejoin in the outlet cavity 70.

Since the first flow F1 through the first cooling passage 60 and the second flow F2 through the second cooling passage 62 diverge from the common inlet cavity 50 and join the common outlet cavity 70, the flow rate of each flow is determined such that pressure losses of both the flows coincide with each other.

Herein, the pressure loss of the first flow F1 is represented by a sum of a pressure loss in a connection between the inlet cavity 50 and the upstream end of the first cooling passage 60, a pressure loss in the first cooling passage 60, and a pressure loss in a connection between the downstream end of the first cooling passage 60 and the outlet cavity 70. On the other hand, the pressure loss of the second flow F2 is represented by a sum of a pressure loss in the inlet opening 54 of the first end plate 34A, a pressure loss in the upstream intermediate cavity 56, a pressure loss in the second cooling passage 62, a pressure loss in the downstream intermediate cavity 58, and a pressure loss in the outlet opening 74 of the first end plate 34B.

Therefore, the flow distribution ratio between the first flow F1 and the second flow F2 can be adjusted by changing a relative relationship between a flow path cross-sectional area of the above-described each flow path portion involved in the pressure loss of the first flow F1 and a flow path cross-sectional area of the above-described each flow path portion involved in the pressure loss of the second flow F2.

In order to adjust the flow distribution ratio between the first flow F1 and the second flow F2, in some embodiments, as described above with reference to FIG. 2, the dimension W1 of the first radial gap G 1 is set to a value greater than the dimension W2 of the second radial gap G2.

In this case, the flow rate of the first flow F1 of the cooling gas passing through the first radial gap G1 increases compared to a case where both the dimensions W1 and W2 are the same. As a result, it is possible to suppress an excessive temperature rise of the cooling gas even in the vicinity of the outlet of the first cooling passage 60, and it is possible to promote heat dissipation to the cooling gas from the pole piece 32 and the stator magnet 22 which are the heat generating parts difficult to cool with the cooling jacket 26.

Further, the cooling structure can be simplified by forming the first cooling passage 60 between the stator 20 and the first rotor 30 including the pole piece 32, and the second cooling passage 62 between the second rotor 40 and the first rotor 30 including the pole piece 32.

Moreover, the flow distribution ratio between the first flow F1 and the second flow F2 can also be adjusted by using the inlet opening 54 or the outlet opening 74 disposed in the first end plate 34 (34A, 34B) of the first rotor 30 as a throttle.

Therefore, in some embodiments, at least either of the inlet opening 54 or the outlet opening 74 disposed in the first end plate 34 (34A, 34B) of the first rotor 30 has an opening area less than a flow path cross-sectional area of the second cooling passage 62.

Whereby, at least either of the inlet opening 54 or the outlet opening 74 functions as the throttle to reduce the flow rate of the cooling gas flowing from the inlet cavity 50 to the outlet cavity 70 via the second cooling passage 62. As a result, the flow rate of the cooling gas flowing from the inlet cavity 50 to the outlet cavity 70 via the first cooling passage 60 increases.

Figure 4:
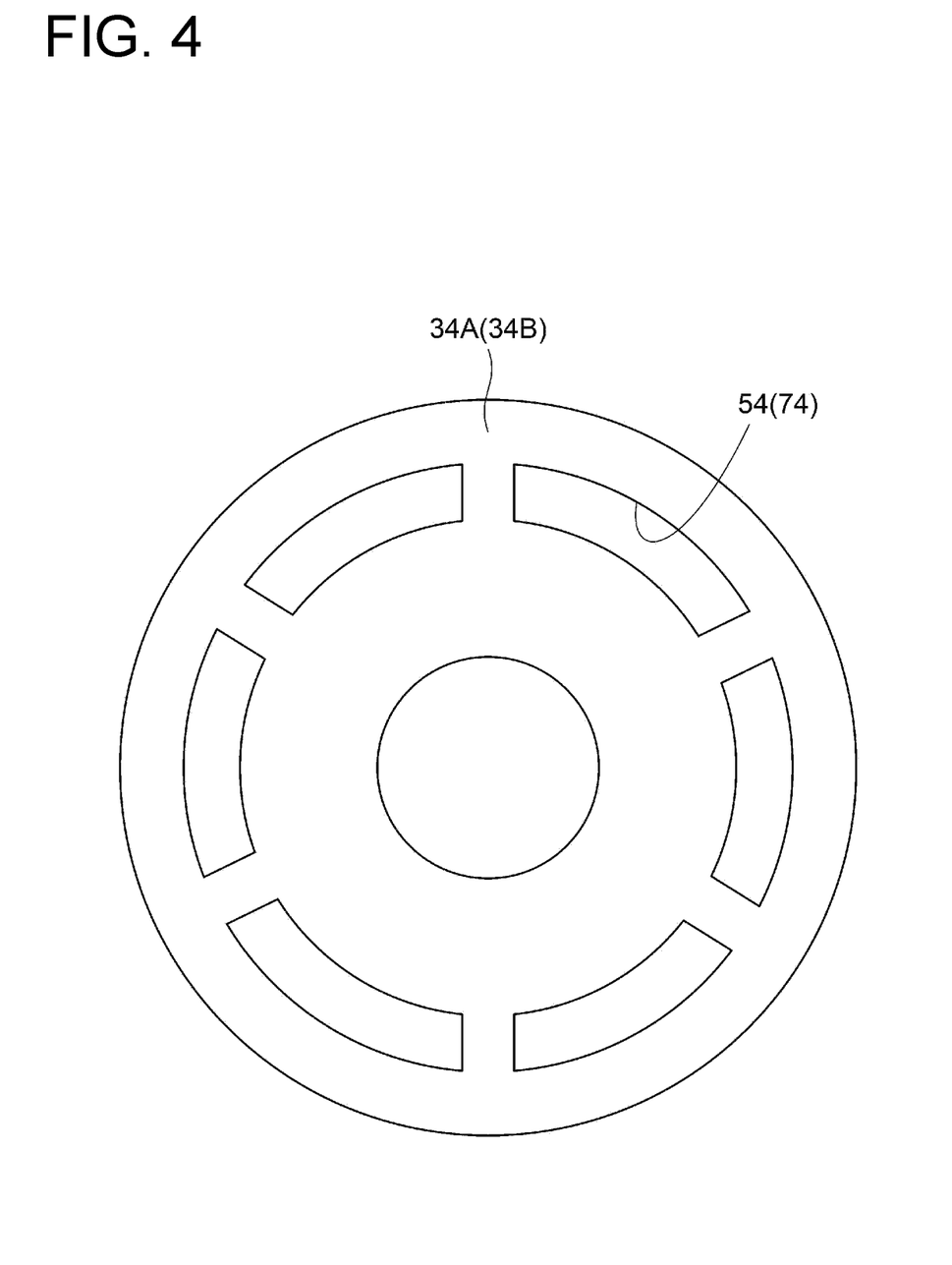
FIG. 4 is a view of a first end plate as viewed from the axial direction according to an embodiment.

FIG. 4 is a view of a first end plate 34 as viewed from the axial direction according to an embodiment.

As shown in the drawing, the first end plate 34A may have a plurality of inlet openings 54 in the circumferential direction. Likewise, the first end plate 34B may have a plurality of outlet openings 74 in the circumferential direction.

The "opening area" of the inlet opening 54 or the outlet opening 74 of the first end plate 34 is a total area of the plurality of openings (the inlet openings 54 or the outlet openings 74), if the first end plate 34 has the plurality of openings (54, 74) as shown in FIG. 4. Further, the "flow path cross-sectional area" of the second cooling passage 62 is the total area occupied by the second cooling passage 62 in the radial cross section as shown in FIG. 3.

From the viewpoint of adjusting the flow distribution ratio between the first flow F1 and the second flow F2, the flow path cross-sectional area of the second cooling passage 62 may be adjusted by the above-described closure member 45.

Figure 5:
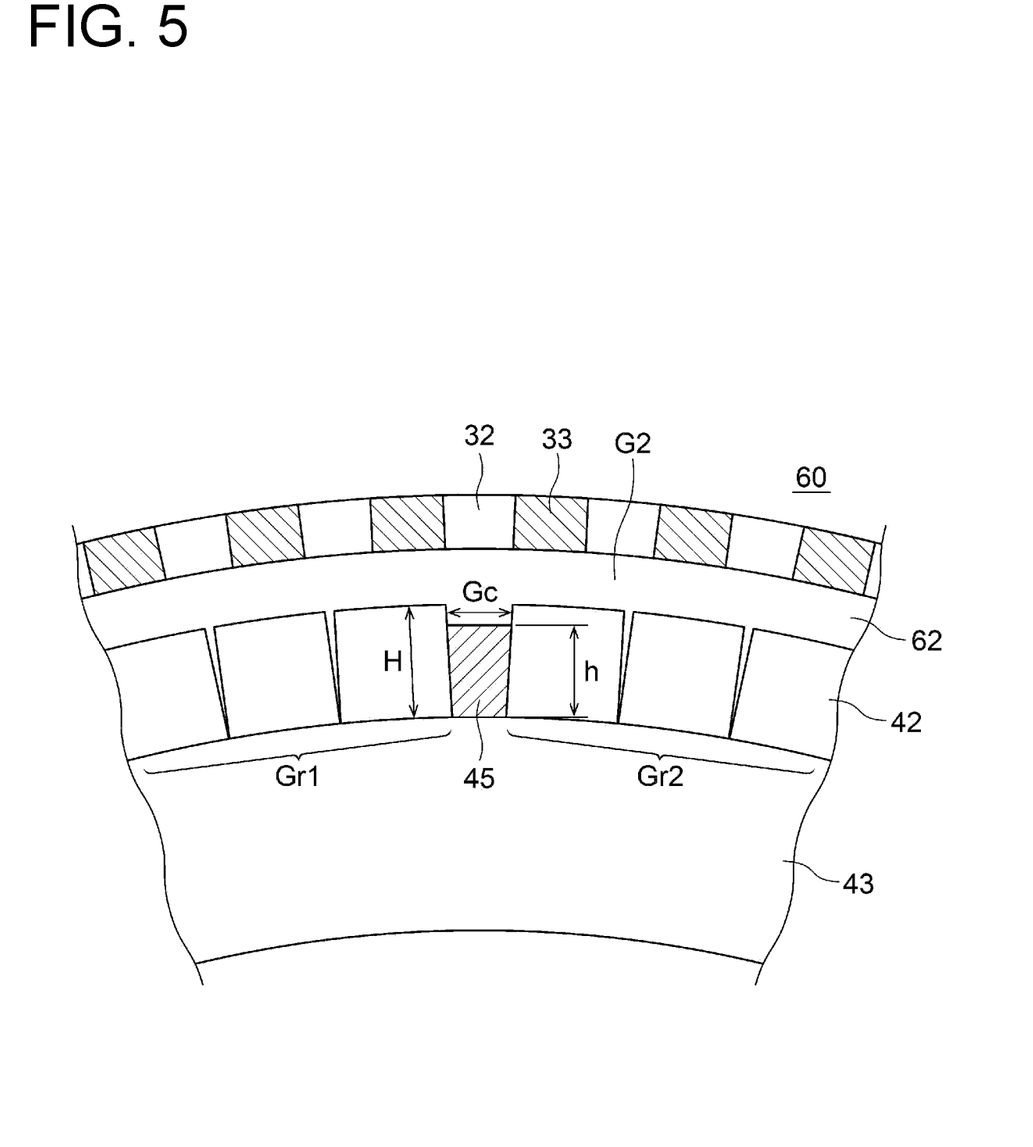
FIG. 5 is a radial cross-sectional view showing a peripheral structure of rotor magnets and a closure member.

FIG. 5 is a radial cross-sectional view showing a peripheral structure of the rotor magnets 42 and the closure member 45.

In some embodiments, as shown in FIG. 5, the plurality of rotor magnets 42 form at least two magnet groups (Gr1, Gr2) arranged with gaps Gc in the circumferential direction on the surface of the rotor core 43. For example, each of the magnet groups (Gr1, Gr2) is composed of the plurality of rotor magnets 42 having the same magnetization direction. The closure member 45 is disposed so as to close at least a part of this circumferential gap Gc.

Whereby, the flow path cross-sectional area of the second cooling passage 62 can be decreased while maintaining the second radial gap G2 that contributes to promoting heat dissipation from the pole piece 32. As a result, the flow rate of the cooling gas flowing from the inlet cavity 50 to the outlet cavity 70 via the first cooling passage 60 increases, and the excessive temperature rise of the cooling gas can be suppressed more effectively even in the vicinity of the outlet of the first cooling passage 60. Whereby, it is possible to further promote heat dissipation to the cooling gas from the pole piece 32 and the stator magnet 22 which are the heat generating parts difficult to cool with the cooling jacket 26.

In the exemplary embodiment shown in FIG. 5, the closure member 45 is disposed on the surface of the rotor core 43 of the second rotor 40 and has a radial dimension h less than a radial dimension H of the rotor magnets 42.

Whereby, it is possible to prevent contact between the closure member 45 and the pole piece 32 during operation of the magnetic geared electrical machine 10.

Further, the flow path cross-sectional area of the second cooling passage 62 can be decreased by closing a region that contributes little to heat dissipation from the pole piece 32 (a region far from the pole piece 32) with the closure member 45 disposed on the surface of the rotor core 43 of the second rotor 40, without impairing the effect of promoting heat dissipation from the pole piece 32 in the second cooling passage 62. Whereby, the flow rate of the cooling gas flowing from the inlet cavity 50 to the outlet cavity 70 via the first cooling passage 60 increases, and it is possible to promote heat dissipation to the first cooling passage 60 from the pole piece 32 and the stator magnet 22 which are the heat generating parts difficult to cool with the cooling jacket 26.

Further, from the viewpoint of adjusting the flow distribution ratio between the first flow F1 and the second flow F2, the shape of the non-magnetic member 33 in the first rotor 30 may be devised.

Figure 6A:
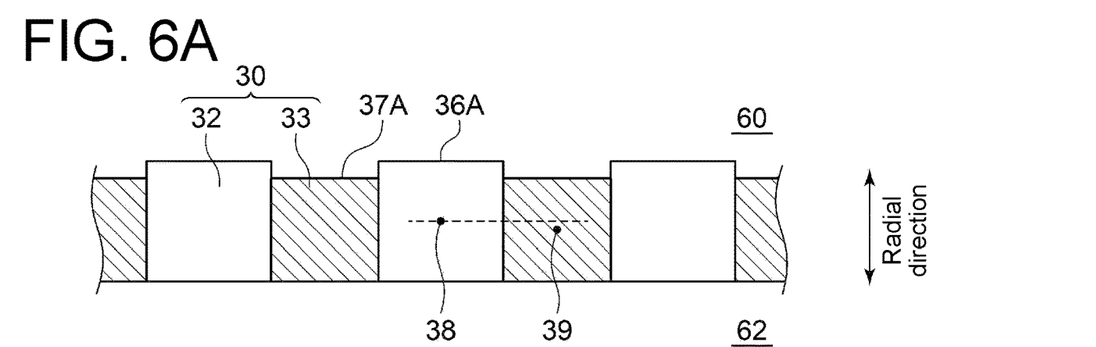
FIG. 6A is a radial cross-sectional view showing the configuration of a pole piece and a non-magnetic member according to an embodiment.
Figure 6B:
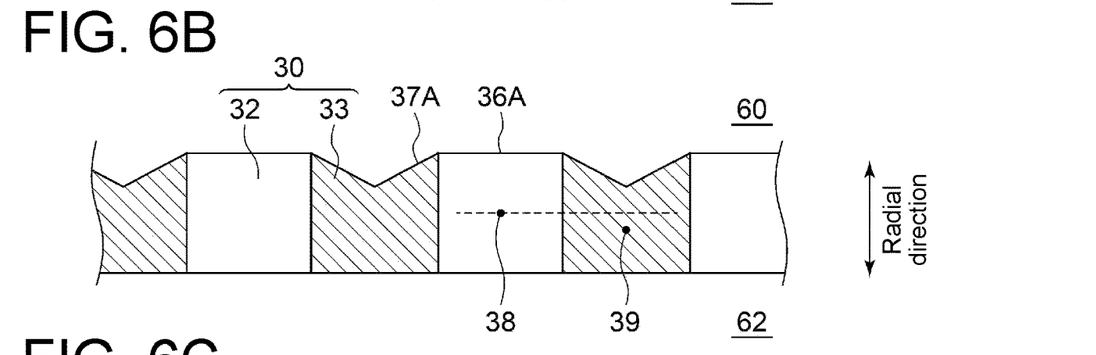
FIG. 6B is a radial cross-sectional view showing the configuration of the pole piece and the non-magnetic member according to another embodiment.
Figure 6C:
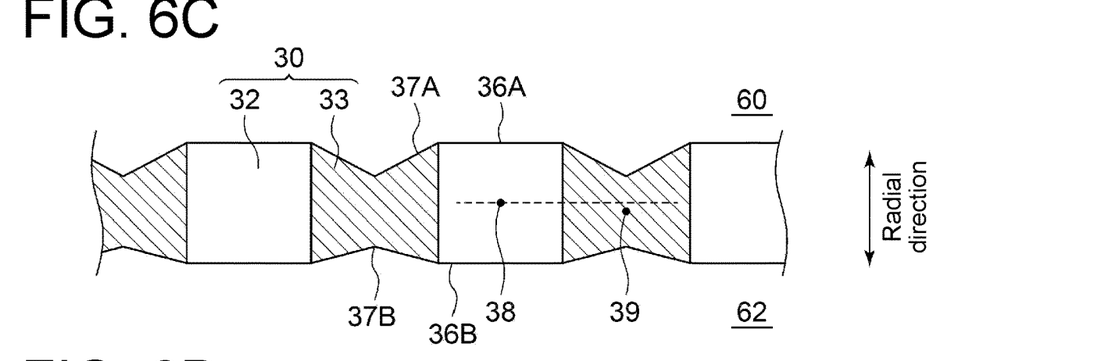
FIG. 6C is a radial cross-sectional view showing the configuration of the pole piece and the non-magnetic member according to another embodiment.
Figure 6D:
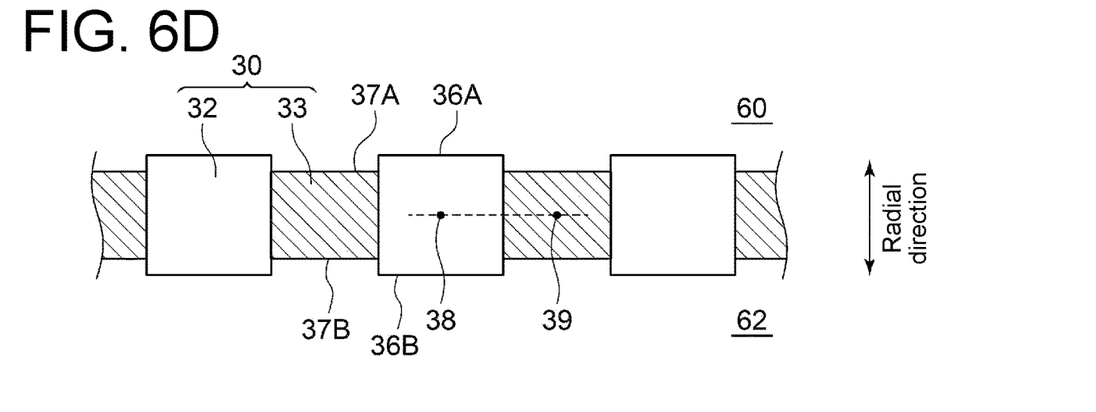
FIG. 6D is a radial cross-sectional view showing the configuration of the pole piece and the non-magnetic member according to another embodiment.

FIG. 6A is a radial cross-sectional view showing the configuration of the pole piece 32 and the non-magnetic member 33 according to an embodiment. FIG. 6B is a radial cross-sectional view showing the configuration of the pole piece 32 and the non-magnetic member 33 according to another embodiment. FIG. 6C is a radial cross-sectional view showing the configuration of the pole piece 32 and the non-magnetic member 33 according to another embodiment. FIG. 6D is a radial cross-sectional view showing the configuration of the pole piece 32 and the non-magnetic member 33 according to still another embodiment.

As shown in FIGS. 6A to 6C, in some embodiments, each of the non-magnetic members 33 arranged alternately with the pole pieces 32 in the circumferential direction has a first surface 37A facing the first cooling passage 60, which is recessed in the radial direction relative to surfaces 36A of the pole pieces 32. Further, as shown in FIGS. 6A to 6C, a centroid 39 of each of the non-magnetic members 33 is located on a side of the second cooling passage 62 relative to a centroid 38 of each of the pole pieces 32, in the radial cross section. Whereby, the flow path cross-sectional area of the first cooling passage 60 is easily secured, making it possible to increase the flow rate of the cooling gas in the first cooling passage 60.

Further, in the examples shown in FIGS. 6C and 6D, each of the non-magnetic members 33 arranged alternately with the pole pieces 32 in the circumferential direction has the first surface 37A facing the first cooling passage 60 and a second surface 37B facing the second cooling passage 62, which are respectively recessed in the radial direction relative to the surfaces 36A and surfaces 36B of the pole pieces 32. In this case, the flow path cross-sectional areas of the first cooling passage 60 and the second cooling passage 62 can be increased by decreasing the area occupied by the non-magnetic members 33 in the radial cross section, while maintaining an air gap that influences magnetic action. Whereby, the pressure loss in the flow path for the cooling gas can be reduced, and power required to supply the cooling gas can be reduced.

In the example shown in FIG. 6D, the centroid 39 of each of the non-magnetic members 33 and the centroid 38 of each of the pole pieces 32 exist at the same radial position.

In the examples of FIGS. 6B and 6C, the first surface 37A of the non-magnetic member 33 increases in amount of recess relative to the surfaces 36A of the pole pieces 32 as a distance from the pole pieces 32 increases, so that the amount of recess relative to the surfaces 36A of the pole pieces 32 is maximized in a central portion of the first surface 37A regarding the circumferential direction.

Whereby, a recessed shape of the first surface 37A of the non-magnetic member 33 can be realized by cutting the non-magnetic member 33 while avoiding damage to the pole piece 32, after the non-magnetic member 33 is formed such that a surface position coincides with the surfaces 36A of the pole pieces 32.

As shown in FIG. 6C, the second surface 37B of the non-magnetic member 33 may also have a recessed shape in which the amount of recess relative to the surfaces 36B of the pole pieces 32 increases as the distance from the pole pieces 32 increases, so that the amount of recess relative to the surfaces 36B of the pole pieces 32 is maximized in a central portion of the second surface 37B regarding the circumferential direction.

Embodiments of the present invention were described in detail above, but the present invention is not limited thereto, and also includes an embodiment obtained by modifying the above-described embodiments and an embodiment obtained by combining these embodiments as appropriate.

For example, the magnetic geared electrical machine 10 shown in FIGS. 2 and 3 has the configuration in which the stator 20, the first rotor 30, and the second rotor 40 are arranged in order radially inward. However, the magnetic geared electrical machine 10 may have a configuration in which the second rotor 40 is located radially outward of the first rotor 30 and the stator 20 is located radially inward of the first rotor 30. In this case, the second rotor 40, the first rotor 30, and the stator 20 are arranged radially inward of the cylindrical rotational shaft 3, 9.

Conclusion

Hereinafter, the overview of the magnetic geared electrical machine 10 and the power generation system 1 using the same according to some embodiments will be described.

(1) A magnetic geared electrical machine (10) according to at least one embodiment of the present invention, includes: a stator (20) including a stator coil (24); a first rotor (30) which includes a plurality of pole pieces (32) arranged with a first radial gap (G1) between the stator (20) and the plurality of pole pieces (32), a first cooling passage (60) including the first radial gap (G1) being formed between the first rotor (30) and the stator (20); a second rotor (40) which includes a plurality of rotor magnets (42), is arranged opposite to the stator (20) across the first rotor (30) in a radial direction with a second radial gap (G2) between the pole pieces (32) and the plurality of rotor magnets (42), a second cooling passage (62) including the second radial gap (G2) being formed between the first rotor (30) and the second rotor (40); an inlet cavity (50) for cooling gas formed on one end side in an axial direction with respect to the stator (20), the first rotor (30) and the second rotor (40); and an outlet cavity (70) formed on another end side in the axial direction with respect to the stator (20), the first rotor (30) and the second rotor (40), the outlet cavity (70) being configured to receive the cooling gas that has passed through each of the first cooling passage (60) and the second cooling passage (62). A dimension W1 of the first radial gap (G1) is greater than a dimension W2 of the second radial gap (G2).

With the above configuration (1), the first radial gap (G1) between the stator (20) and the first rotor (30) is greater than the second radial gap (G2) between the first rotor (30) and the second rotor (40) (W1>W2), the flow rate of the cooling gas passing through the first radial gap (G1) increases compared to the case where both the gaps have the same dimension. As a result, it is possible to suppress an excessive temperature rise of the cooling gas even in the vicinity of the outlet of the first cooling passage (60), and it is possible to promote heat dissipation to the cooling gas from the pole piece (32) and the stator magnet (22) which are the heat generating parts difficult to cool with the cooling jacket (26).

Further, the cooling structure can be simplified by forming the first cooling passage (60) between the stator (20) and the first rotor (30) including the pole piece (32), and the second cooling passage (62) between the second rotor (40) and the first rotor (30) including the pole piece (32).

(2) In some embodiments, in the above configuration (1), the first rotor (30) includes a pair of end plates (34A, 34B) disposed at both ends of the pole pieces (32) in the axial direction so as to face the inlet cavity (50) and the outlet cavity (70), respectively, the inlet cavity (50) communicates with the second cooling passage (62) via an inlet opening (54) disposed in one of the end plates (34A), the outlet cavity (70) communicates with the second cooling passage (62) via an outlet opening (74) disposed in the other of the end plates (34B), and at least either of the inlet opening (54) or the outlet opening (74) has an opening area less than a flow path cross-sectional area of the second cooling passage (62).

With the above configuration (2), at least either of the inlet opening (54) or the outlet opening (74) functions as the throttle to reduce the flow rate of the cooling gas flowing from the inlet cavity (50) to the outlet cavity (70) via the second cooling passage (62). As a result, the flow rate of the cooling gas flowing from the inlet cavity (50) to the outlet cavity (70) via the first cooling passage (60) increases, and the excessive temperature rise of the cooling gas can be suppressed more effectively even in the vicinity of the outlet of the first cooling passage (60). Whereby, it is possible to further promote heat dissipation to the cooling gas from the pole piece (32) and the stator magnet (30) which are the heat generating parts difficult to cool with the cooling jacket (26).

(3) In some embodiments, in the above configuration (1) or (2), the plurality of rotor magnets (42) form at least two magnet groups (Gr1, Gr2) arranged with gaps in a circumferential direction on a surface of a rotor core (43) of the second rotor (40), and the magnetic geared electrical machine (10) includes a closure member (45) disposed in at least one of the gaps.

In the case of the configuration where the rotor magnets (42) are arranged on the surface of the rotor core (43), not only the second radial gap (G2) between the rotor magnets (42) and the pole pieces (32) but also a gap (circumferential gap Gc) between the magnet groups (Gr1, Gr2) of the rotor magnets (42) adjacent in the circumferential direction can form the second cooling passage (62). The second radial gap (G2) facing the pole piece (32) contributes to promoting heat dissipation from the pole pieces (32). On the other hand, the above-described circumferential gap (Gc) located away from the pole pieces (32) contributes relatively little to promoting heat dissipation from the pole pieces (32).

In this regard, with the above configuration (3), since the closure member (45) is disposed in at least one of the gaps (circumferential gap Gc) between the magnet groups (Gr1, Gr2) adjacent in the circumferential direction, the flow path cross-sectional area of the second cooling passage (62) can be decreased while maintaining the second radial gap (G2) that contributes to promoting heat dissipation from the pole pieces (32). As a result, the flow rate of the cooling gas flowing from the inlet cavity (50) to the outlet cavity (70) via the first cooling passage (60) increases, and the excessive temperature rise of the cooling gas can be suppressed more effectively even in the vicinity of the outlet of the first cooling passage (60). Whereby, it is possible to further promote heat dissipation to the cooling gas from the pole piece (32) and the stator magnet (22) which are the heat generating parts difficult to cool with the cooling jacket (26).

(4) In some embodiments, in the above configuration (3), the closure member (45) is disposed on the surface of the rotor core (43) of the second rotor (40) and has a radial dimension (h) less than a radial dimension (H) of the rotor magnets (42).

Of the gap (circumferential gap Gc) between the magnet groups (Gr1, Gr2) of the rotor magnets (42) adjacent in the circumferential direction, a region near the surface of the rotor core (43) of the second rotor (40) has a long distance from the pole pieces (32), and thus has a little contribution to heat dissipation from the pole pieces (32).

In this regard, with the above configuration (4), the flow path cross-sectional area of the second cooling passage (62) can be decreased by closing the region that contributes little to heat dissipation from the pole piece (32) with the closure member (45) disposed on the surface of the rotor core (43) of the second rotor (40), without impairing the effect of promoting heat dissipation from the pole piece (32) in the second cooling passage (62). Whereby, the flow rate of the cooling gas flowing from the inlet cavity (50) to the outlet cavity (70) via the first cooling passage (60) increases, and it is possible to promote heat dissipation to the first cooling passage (60) from the pole piece (32) and the stator magnet (22) which are the heat generating parts difficult to cool with the cooling jacket (26).

Further, with the above configuration (4), since the radial dimension (H) of the closure member (45) is less than the radial dimension (h) of the rotor magnets (42), it is possible to prevent contact between the closure member (45) and the pole piece (32) during operation of the magnetic geared electrical machine (10).

(5) In some embodiments, in any one of the above configurations (1) to (4), the first rotor (30) includes a plurality of non-magnetic members (33) arranged alternately with the plurality of pole pieces (32) in a circumferential direction, and a first surface (37A) of each of the non-magnetic members (33) facing the first cooling passage (60) is recessed in the radial direction relative to surfaces (36A) of the pole pieces (32).

With the above configuration (5), since the first surface (37A) of the non-magnetic member (33) facing the first cooling passage (60) is recessed with reference to the surfaces (36A) of the pole pieces (32), the flow path cross-sectional area of the first cooling passage (60) increases. Accordingly, the flow rate of the cooling gas flowing from the inlet cavity (50) to the outlet cavity (70) via the first cooling passage (60) increases, promoting heat dissipation to the first cooling passage (60) from the pole piece (32) and the stator magnet (22) which are the heat generating parts difficult to cool with the cooling jacket (26).

(6) In some embodiments, in the above configuration (5), a second surface (37B) of each of the non-magnetic members (33) facing the second cooling passage (62) is recessed in the radial direction relative to the surfaces (36B) of the pole pieces (32).

With the above configuration (6), not only the first surface (37A) but also the second surface (37B) of the non-magnetic member (33) has the shape recessed in the radial direction relative to the surfaces (36B) of the pole pieces (32), the flow path cross-sectional areas of the first cooling passage (60) and the second cooling passage (62) can be increased while maintaining the air gap. Whereby, the pressure loss in the flow path for the cooling gas can be reduced, and power required to supply the cooling gas can be reduced.

(7) In some embodiments, in the above configuration (5) or (6), the first surface (37A) of each of the non-magnetic members (33) increases in amount of recess relative to the surfaces (36A) of the pole pieces (32) as a distance from the pole pieces (32) increases, so that the amount of recess relative to the surfaces (36A) of the pole pieces (32) is maximized in a central portion of the first surface (37A) regarding the circumferential direction.

With the above configuration (7), the recessed shape of the first surface (37A) of the non-magnetic member (33) can be realized by cutting the non-magnetic member (33) while avoiding damage to the pole piece (32), after the non-magnetic member (33) is formed such that a surface position coincides with the surfaces (36A) of the pole pieces (32).

As with the first surface (37A), the second surface (37B) of the non-magnetic member (33) may also have the recessed shape described above in (7).

(8) In some embodiments, in any one of the above configurations (1) to (7), the first rotor (30) includes a plurality of non-magnetic members (33) arranged alternately with the plurality of pole pieces (32) in a circumferential direction, and a centroid (39) of each of the non-magnetic members (33) is located on a side of the second cooling passage (62) relative to a centroid (38) of each of the pole pieces (32), in a cross section along the radial direction.

With the above configuration (8), the amount of decrease in flow path cross-sectional area of the first cooling passage (60) due to the installation of the non-magnetic member (33) can relatively be small compared to the amount of decrease in flow path cross-sectional area of the second cooling passage (62) by arranging the non-magnetic member (33) closer to the second cooling passage (62). Whereby, the flow rate of the cooling gas flowing from the inlet cavity (50) to the outlet cavity (70) via the first cooling passage (60) increases, and it is possible to promote heat dissipation to the first cooling passage (60) from the pole piece (32) and the stator magnet (22) which are the heat generating parts difficult to cool with the cooling jacket (26).

(9) A power generation system (1) according to at least one embodiment of the present invention, includes: a prime mover (2); and a magnetic geared generator (10A) driven by the prime mover (2). The magnetic geared generator is configured by the magnetic geared electrical machine (10) having any of the above configurations (1) to (8).

With the above configuration (9), as described above with respect to the above configuration (1), since the first radial gap (G1) between the stator (20) and the pole pieces (32) is greater than the second radial gap (G2) between the pole pieces (32) and the second rotor (40) (W1>W2), the flow rate of the cooling gas passing through the first radial gap (G1) increases compared to the case where both the gaps have the same dimension. As a result, it is possible to suppress the excessive temperature rise of the cooling gas even in the vicinity of the outlet of the first cooling passage (60), and it is possible to promote heat dissipation to the cooling gas from the pole piece (32) and the stator magnet (22) which are the heat generating parts difficult to cool with the cooling jacket (26).

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "including" or "having" one constitutional element is not an exclusive expression that excludes the presence of other constitutional elements.

REFERENCE SIGNS LIST

1 Power generation system
2 Prime mover
3, 9 Rotational shaft
4 Power supply destination
6 Power supply source
8 Rotating machine
10 Magnetic geared electrical machine
10A Magnetic geared generator
10B Magnetic geared motor
20 Stator
21 Housing
21A, 21B Radial wall
22 Stator magnet
23 Stator core
24 Stator coil
24A Coil end
25 Slot
26 Cooling jacket
30 First rotor
32 Pole piece
33 Non-magnetic member
34, 34A, 34B First end plate
36A, 36B Surface
37A First surface
37B Second surface
38, 39 Centroid
40 Second rotor
42 Rotor magnet
43 Rotor core
44, 44A, 44B Second end plate
45 Closure member
50 Inlet cavity
52 Cooling gas inlet
54 Inlet opening
56 Upstream intermediate cavity
58 Downstream intermediate cavity
60 First cooling passage
62 Second cooling passage
70 Outlet cavity
72 Cooling gas outlet
74 Outlet opening
B1, B2 Bearing
F1 First flow
F2 Second flow
G1 First radial gap
G2 Second radial gap
Gc Gap
H, h Radial dimension
P Electric power

The invention claimed is:

1. A magnetic geared electrical machine, comprising:
a stator including a stator coil;
a first rotor which includes a plurality of pole pieces arranged with a first radial gap between the stator and the plurality of pole pieces, a first cooling passage including the first radial gap being formed between the first rotor and the stator;
a second rotor which includes a plurality of rotor magnets, is arranged opposite to the stator across the first rotor in a radial direction with a second radial gap between the pole pieces and the plurality of rotor magnets, a second cooling passage including the second radial gap being formed between the first rotor and the second rotor;
an inlet cavity for cooling gas formed on one end side in an axial direction with respect to the stator, the first rotor and the second rotor; and
an outlet cavity formed on another end side in the axial direction with respect to the stator, the first rotor and the second rotor, the outlet cavity being configured to receive the cooling gas that has passed through each of the first cooling passage and the second cooling passage, wherein the first rotor includes a pair of end plates disposed at both ends of the pole pieces in the axial direction so as to face the inlet cavity and the outlet cavity, respectively, the inlet cavity is formed in the axial direction between:
one radial wall of a housing mounted on a rotational shaft, and
one axial end face of the stator and one of the end plates, the outlet cavity is formed in the axial direction between:
another radial wall of the housing, and
the other axial end face of the stator and the other of the end plates, a dimension of the first radial gap is greater than a dimension of the second radial gap, the first rotor includes a plurality of non-magnetic members arranged alternately with the plurality of pole pieces in a circumferential direction, and a first surface of each of the non-magnetic members facing the first cooling passage is recessed in the radial direction relative to surfaces of the pole pieces.

2. The magnetic geared electrical machine according to claim 1, wherein
the inlet cavity communicates with the second cooling passage via an inlet opening disposed in one of the end plates,
the outlet cavity communicates with the second cooling passage via an outlet opening disposed in the other of the end plates, and
at least either of the inlet opening or the outlet opening has an opening area less than a flow path cross-sectional area of the second cooling passage.

3. The magnetic geared electrical machine according to claim 1, wherein
the plurality of rotor magnets form at least two magnet groups arranged with gaps in a circumferential direction on a surface of a rotor core of the second rotor, and
the magnetic geared electrical machine comprises a closure member disposed in at least one of the gaps.

4. The magnetic geared electrical machine according to claim 3, wherein the closure member is disposed on the surface of the rotor core of the second rotor and has a radial dimension less than a radial dimension of the rotor magnets.

5. The magnetic geared electrical machine according to claim 1, wherein a second surface of each of the non-magnetic members facing the second cooling passage is recessed in the radial direction relative to the surfaces of the pole pieces.

6. The magnetic geared electrical machine according to claim 1, wherein the first surface of each of the non-magnetic members increases in amount of recess relative to the surfaces of the pole pieces as a distance from the pole pieces increases, so that the amount of recess relative to the surfaces of the pole pieces is maximized in a central portion of the first surface regarding the circumferential direction.

7. A magnetic geared electrical machine, comprising:
a stator including a stator coil;
a first rotor which includes a plurality of pole pieces arranged with a first radial gap between the stator and the plurality of pole pieces, a first cooling passage including the first radial gap being formed between the first rotor and the stator;
a second rotor which includes a plurality of rotor magnets, is arranged opposite to the stator across the first rotor in a radial direction with a second radial gap between the pole pieces and the plurality of rotor magnets, a second cooling passage including the second radial gap being formed between the first rotor and the second rotor;
an inlet cavity for cooling gas formed on one end side in an axial direction with respect to the stator, the first rotor and the second rotor; and
an outlet cavity formed on another end side in the axial direction with respect to the stator, the first rotor and the second rotor, the outlet cavity being configured to receive the cooling gas that has passed through each of the first cooling passage and the second cooling passage, wherein
the first rotor includes a pair of end plates disposed at both ends of the pole pieces in the axial direction so as to face the inlet cavity and the outlet cavity, respectively,
the inlet cavity is formed in the axial direction between:
one radial wall of a housing mounted on a rotational shaft, and
one axial end face of the stator and one of the end plates,
the outlet cavity is formed in the axial direction between:
another radial wall of the housing, and
the other axial end face of the stator and the other of the end plates,
a dimension of the first radial gap is greater than a dimension of the second radial gap,
the first rotor includes a plurality of non-magnetic members arranged alternately with the plurality of pole pieces in a circumferential direction, and
a centroid of each of the non-magnetic members is located on a side of the second cooling passage relative to a centroid of each of the pole pieces, in a cross section along the radial direction.

8. A power generation system, comprising:
a prime mover; and
a magnetic geared generator driven by the prime mover, wherein
the magnetic geared generator is configured by the magnetic geared electrical machine according to claim 1.

* * * * *